United States Patent
Izumi et al.

(10) Patent No.: US 8,831,805 B2
(45) Date of Patent: Sep. 9, 2014

(54) CONSTRUCTION MACHINE AND INDUSTRIAL VEHICLE HAVING POWER SUPPLY SYSTEM

(75) Inventors: Shiho Izumi, Hitachinaka (JP); Satoru Kaneko, Naka (JP); Takashi Ikimi, Hitachi (JP); Nobuo Masano, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 416 days.

(21) Appl. No.: 13/202,143

(22) PCT Filed: Mar. 31, 2010

(86) PCT No.: PCT/JP2010/055900
§ 371 (c)(1),
(2), (4) Date: Sep. 7, 2011

(87) PCT Pub. No.: WO2010/114036
PCT Pub. Date: Oct. 7, 2010

(65) Prior Publication Data
US 2011/0313608 A1 Dec. 22, 2011

(30) Foreign Application Priority Data

Mar. 31, 2009 (JP) .................................. 2009-086434
Aug. 26, 2009 (JP) .................................. 2009-195529

(51) Int. Cl.
*B60L 1/00* (2006.01)
(52) U.S. Cl.
CPC ........................................ *B60L 1/00* (2013.01)
USPC .................. 701/22; 701/36; 701/50; 701/55; 701/58
(58) Field of Classification Search
CPC ........................................................ B60L 1/00
USPC ..................................... 701/22, 36, 50, 55, 58
See application file for complete search history.

(56) References Cited

U.S. PATENT DOCUMENTS 8,008,801 B2 * 8/2011 Fujino et al. ................. 307/10.1
8,207,708 B2 * 6/2012 Morinaga et al. ............... 322/14

FOREIGN PATENT DOCUMENTS

| JP | 2002-320302 | 10/2002 |
| JP | 2003-219566 | 7/2003 |
| JP | 2006-59685 | 3/2006 |
| JP | 2006-321640 | 11/2006 |
| JP | 2008-297121 | 12/2008 |

* cited by examiner

*Primary Examiner* — John Q Nguyen
*Assistant Examiner* — Michael Kerrigan
(74) *Attorney, Agent, or Firm* — Antonelli, Terry, Stout & Kraus, LLP.

(57) ABSTRACT

A construction machine or industrial vehicle having a power supply system which includes a chargeable and dischargeable capacitor and a feeder circuit connecting a battery and the capacitor to a load capable of power running and regeneration. The capacitor is connected through a DC/DC converter which includes a controller that controls energy charged or discharged by the capacitor through the DC/DC converter to the load. The controller includes a power running/regeneration operation estimater which estimates an operation pattern including a point of change between power running and regeneration modes of the motor, or DC current supplied to an inverter, or control lever information and previously stored operation pattern information, and a capacitor target voltage calculator which controls an output command value of the DC/DC converter according to the estimated operation pattern so that a capacitor target voltage sequentially decreases in power running and sequentially increases in regeneration.

6 Claims, 8 Drawing Sheets

CONSTRUCTION MACHINE AND INDUSTRIAL VEHICLE HAVING POWER SUPPLY SYSTEM

TECHNICAL FIELD

The present invention relates to construction machines and industrial vehicles which are provided with a power supply system and more specifically to construction machines and industrial vehicles which are provided with a power supply system suitable for hydraulic shovels, forklifts and the like.

BACKGROUND ART

A hybrid vehicle using a motor for a vehicle driving system, electric vehicle or battery forklift is provided with a battery for driving the traveling motor, in which AC power is supplied from the battery to the motor through an inverter.

Industrial vehicles such as battery forklifts employ lead batteries as power sources and taking into consideration the energy which these industrial vehicles consume during traveling or work operation, the battery capacity must be large enough.

Even when a vehicle has a large capacity battery, if the battery is a lead battery, it may happen that most regenerative energy in regenerative braking is lost and cannot be recovered since the lead battery is not suitable for rapid charging.

Therefore, in recent years, an attempt to improve efficiency has been made by combining a battery and a capacitor to constitute a power supply system and storing the energy from a load in the capacitor and making it possible to supply the stored energy to the load instantaneously.

For example, Patent Literature 1 describes a power supply system as a combination of a battery and a capacitor in which a current-voltage converter is placed between the charge-discharge capacitor and battery and in the drive control mode of a motor as a load, the capacitor is connected to a discharge path and in the regenerative braking mode of the motor, the capacitor is connected to a charge path so as to decrease the capacity of power supply such as the battery and supply the required maximum energy to the load.

CITATION LIST

Patent Literature

Patent Literature 1: JP-A No. 2002-320302
Patent Literature 2: JP-A No. 2006-321640

SUMMARY OF INVENTION

Technical Problem

According to Patent Literature 1 concerning the above conventional technique, regenerative energy can be recovered and also the capacity of the battery or capacitor can be decreased. However, the document does not disclose details of a method to realize the recovery of regenerative energy and the decrease in the capacity of the battery or capacitor.

Also, Patent Literature 2 describes that the burden of controlling regenerative energy is reduced by performing regenerative operation only under a predetermined condition when power running and regeneration are repeated; however, while this technique may be applied to a case of simple control such as regeneration during free fall operation of a crane, in a case that acceleration and braking occur in a series of operations and power running and regeneration modes are switched as in swinging of a hydraulic shovel, it is difficult to adopt the technique due to the problem with the response of the power supply system.

The present invention has been made in view of the above circumstances and provides a control technique which recovers regenerative energy with high efficiency and decreases the capacity of a battery or capacitor.

Solution to Problem

The present invention adopts the following means in order to solve the above problem.

In a construction machine or industrial vehicle having a power supply system which includes a chargeable and dischargeable capacitor and a feeder circuit connecting a chargeable and dischargeable battery and the capacitor to a load capable of power running and regeneration, and feeds energy stored in the capacitor through an inverter to the load and feeds regenerative energy of the load through the inverter to the capacitor, the load is an electric motor, the capacitor is connected through a DC/DC converter to the load, the DC/DC converter includes control means that controls energy charged or discharged by the capacitor through the DC/DC converter, and the control means includes power running/regeneration operation estimating means which estimates an operation pattern including a point of change between power running and regeneration modes of the motor according to revolution speed and torque of the motor, or DC current supplied to the inverter, or control lever information and previously stored operation pattern information including a point of change between power running and regeneration in repetitive work; and capacitor target voltage calculating means which controls an output command value of the DC/DC converter according to the point of change and operation pattern estimated by the power running/regeneration operation estimating means so that a capacitor target voltage sequentially decreases in power running and sequentially increases in regeneration.

Advantageous Effects of Invention

The present invention has the abovementioned constitution, so it can recover regenerative energy with high efficiency and decrease the battery capacity.

DESCRIPTION OF EMBODIMENTS

Next, the most preferred embodiments will be described referring to the accompanying drawings.

First Embodiment

Figure 1:
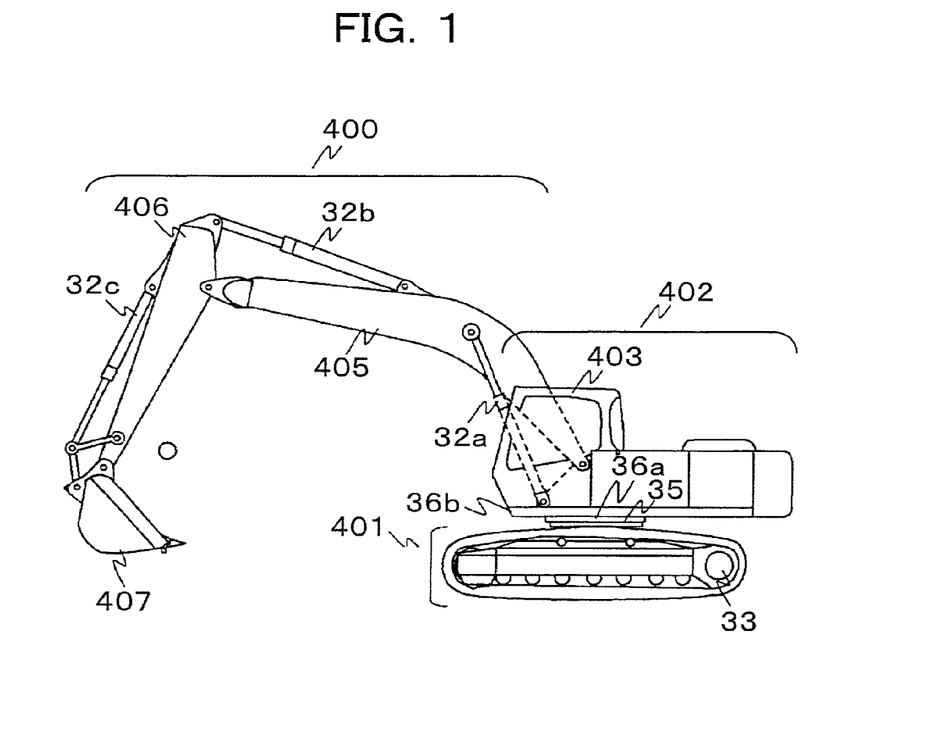
FIG. 1 illustrates a hybrid hydraulic shovel provided with a power supply system according to a first embodiment.

FIG. 1 illustrates a hybrid hydraulic shovel provided with a power supply system according to the first embodiment.

In FIG. 1, the hydraulic shovel includes a traveling body 401 and a swing body 402 and the traveling body 401 is driven by a traveling hydraulic motor 33. A driver seat 403 is provided on the front left side in the swing body 402 and a multi-jointed working device 400 having a boom 405, an arm 406 and a bucket 407 is provided on the front right side.

The boom 405, arm 406, and bucket 407 are driven respectively by a boom cylinder 32a, arm cylinder 32b, and bucket cylinder 32c which are hydraulic actuators.

Figure 2:
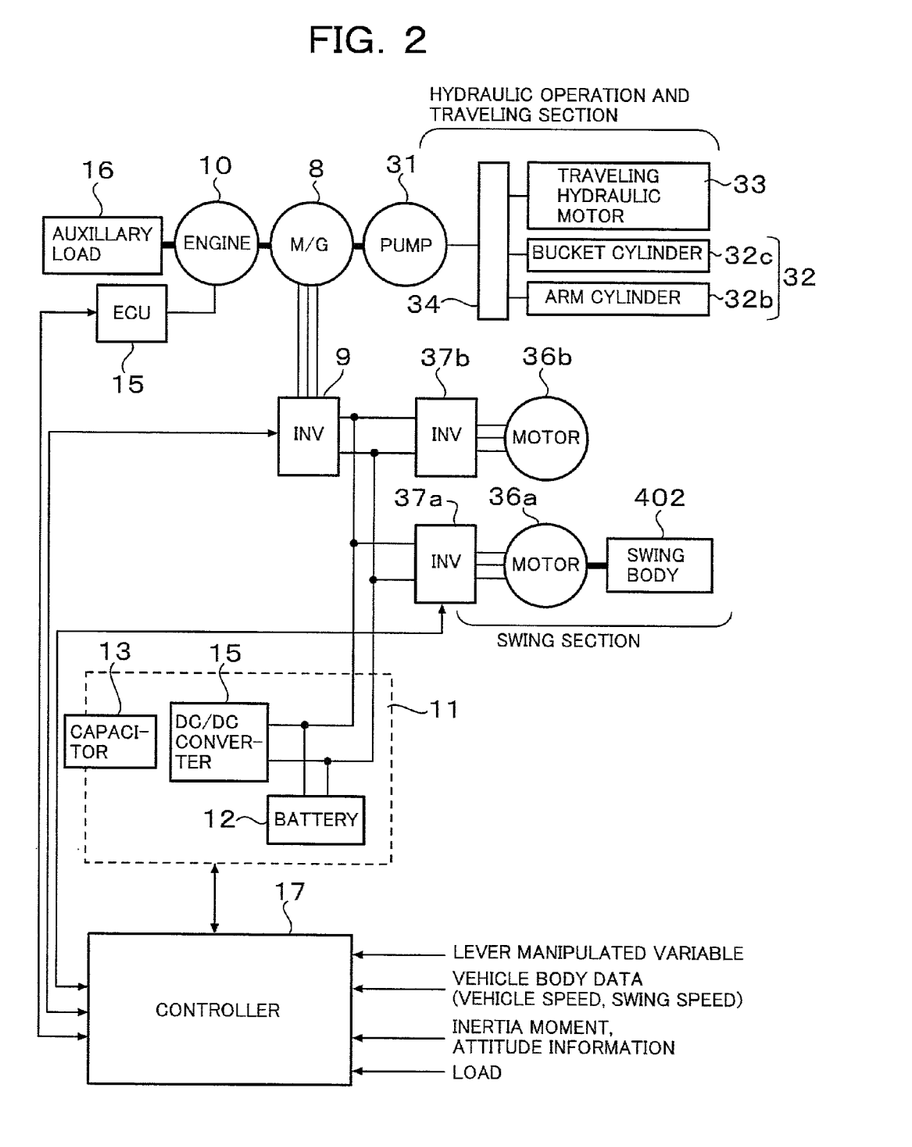
FIG. 2 shows the configuration of the driving section of the hybrid hydraulic shovel and the configuration of the power supply system incorporated therein according to the first embodiment.

FIG. 2 shows the configuration of the driving section of the hybrid hydraulic shovel shown in FIG. 1 and the configuration of the power supply system 1 incorporated therein according to the first embodiment.

The traveling hydraulic motor 33 and hydraulic actuators for driving the working device (arm cylinder 32b, bucket cylinder 32c) are driven by hydraulic fluid discharged from a hydraulic pump 31 driven by an engine 10. Further, the engine 10 is connected with a motor generator 8 and the motor generator 8 is driven by the engine 10 and also driven by the hydraulic pump 31 to perform regenerative operation.

The traveling hydraulic motor 33, arm cylinder 32b and bucket cylinder 32c are communicated with the hydraulic pump 31 through a control valve 34 so that the hydraulic fluid is sent and received. The swing body 402 can swing on the traveling body 401 by means of an AC motor 36a for swinging. The swing motor 36a and a boom driving motor 36b are connected through an inverter 37a and an inverter 37b respectively to a battery 12 and a DC/DC converter 15. Also, the DC/DC converter 15 is connected to a capacitor 13 so that receiving and sending of power running/regeneration energy takes place between the capacitor and the motors 36a and 36b.

The inverters 37a and 37b are connected to a controller 11 and controlled by the controller 11. The controller 11 controls the power supply system 1 and the inverter 9 and engine control unit (ECU) 15 which are connected with the motor generator 8 driven by the engine 10 according to such information as the manipulated variable of a control lever (not shown), motor torque or revolution speed as a basis of vehicle data including vehicle speed and swing speed, inverter current value, and the load of earth and sand shoveled by the working device.

For construction machines such as hydraulic shovels and industrial vehicles such as forklifts, their operation patterns are almost fixed, so it is easy to estimate the required power running energy and the regenerative energy which will be generated, according to their operation patterns.

More specifically, the next point of change between power running and regeneration (time of operational change from power running to regeneration or from regeneration to power running) is estimated using the present operating state and predetermined operation pattern information and the energy which can be received from and sent to the capacitor is calculated according to the estimated point of change and target voltage Vc* of the capacitor 13 can be determined depending on the calculated energy.

In this embodiment, the DC/DC converter 14 is located between the motor 36a as a load and the capacitor 13 so that the voltage of the capacitor can be increased or decreased. Here, while the voltage of the battery 12 is 48 V, the operating voltage of the capacitor 13 is, for example, in the range from 48 V to 90 V.

In this power supply system 1, the DC/DC converter 14 is controlled so that when the amount of charge of the capacitor 13 is insufficient, electricity is sent from the battery 12 to the capacitor 13, and when the amount of charge of the capacitor 13 comes closer to or reaches the upper chargeable limit, it charges the battery 12.

In a lead battery, there is a considerable loss in charging, so regenerative energy cannot be recovered by the battery efficiently. Furthermore, if the lead battery is charged or discharged at large current repeatedly, the battery tends to deteriorate quickly, resulting in a shorter service life. For this reason, when power running and regeneration by the motor are repeated during swinging of the vehicle, it is desirable to use charge and discharge by the capacitor 13 as far as possible. This can improve the energy efficiency in charging and discharging.

Figure 3:
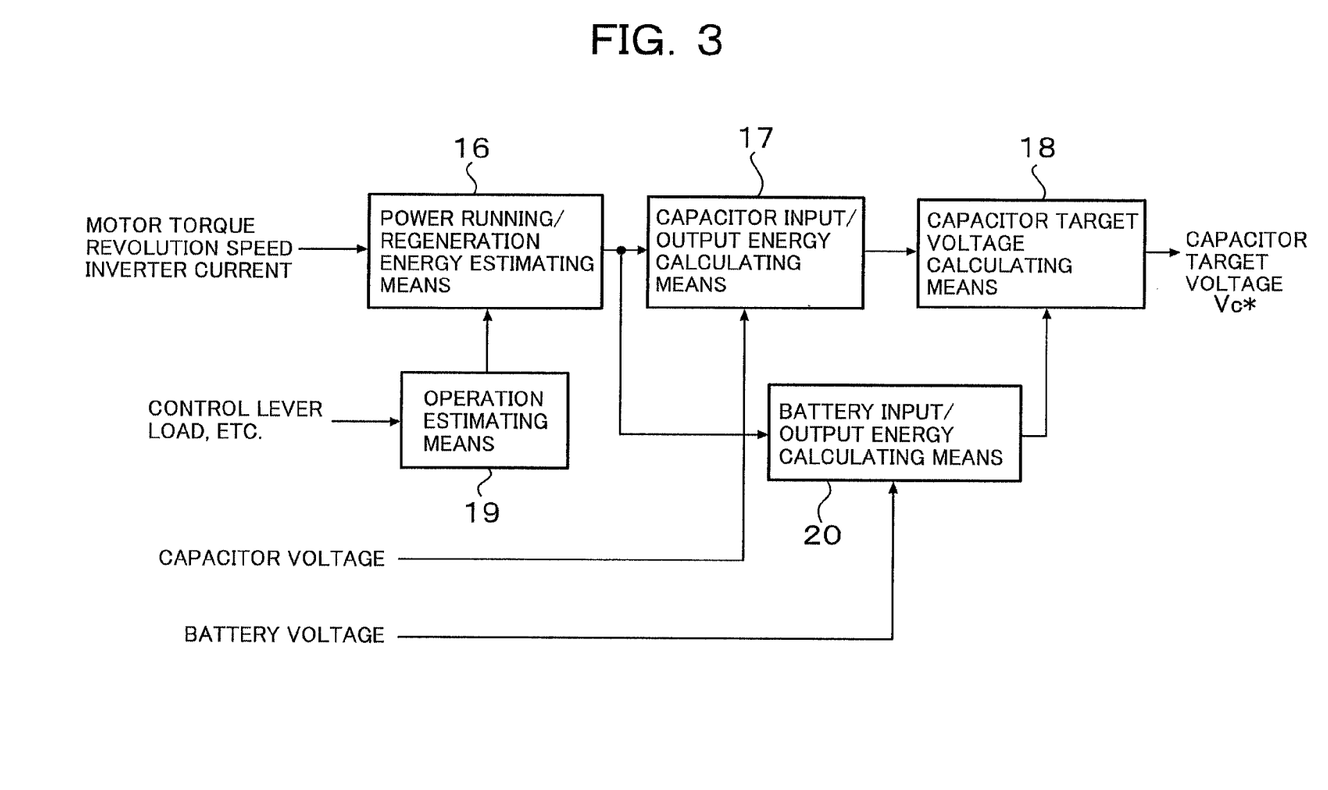
FIG. 3 is a block diagram showing the functions of the controller shown in FIG. 2.

FIG. 3 is a block diagram showing the functions of the controller 11 shown in FIG. 2. Generally, a construction machine often carries out repetitive motions, so a point of change between power running and regeneration, for example, a point of change from acceleration to deceleration in a swing motion, can be known based on the swing angle and swing speed previously in many cases.

In this embodiment, power running/regeneration operation estimating means 19 previously obtains and stores operation pattern information including a point of change between power running and regeneration in repetitive work based on the manipulated variable of the control lever, swing speed, swing motor torque and information from the stroke sensors of the actuators.

Then, the next point of change between power running and regeneration and an operation pattern including that point of change are estimated based on the stored operation pattern information and present operation information.

For example, when the swing AC motor 36a is in the power running mode, swing acceleration is underway and when switching to regenerative braking operation for stopping occurs (point of change) can be estimated from the (present) swing speed and motor torque, the current value of the swing motor inverter and the previously stored operation pattern information.

The direction of change (from power running to regeneration or from regeneration to power running) can be estimated from operation of the control lever. For example, when the boom 405 or arm 406 is moved upward (power running operation) by operation of the control lever, next motion can be estimated to be regenerative operation for downward movement.

Power running/regeneration energy calculating means 16 calculates the grace period until the point of change between power running and regeneration and the power running/regeneration energy required before the grace period according to the information on the torque and revolution speed of the swing motor 36a required for swing acceleration/deceleration at the present time and previously stored operation pattern and information on the point of change estimated by the operation estimating means 19.

Capacitor input/output energy calculating means 17 calculates whether the capacitor 13 can output all the power running/regeneration energy of the load or whether the capacitor can receive all regenerative energy.

Based on the result of calculation by the capacitor input/output energy calculating means 17, battery input/output energy calculating means 20 calculates whether the battery 12 should discharge electricity for power running operation of the load and whether the battery 12 should also be charged for regeneration operation of the load.

Capacitor target voltage calculating means 18 determines target voltage Vc* of the capacitor 13 according to the power running/regeneration energy calculated by the power running/regeneration energy calculating means 16. For example, the target voltage Vc* of the capacitor 13 in regeneration is so determined that regenerative energy can be received by the capacitor 13 as far as possible, as mentioned later. At this time, the target voltage of the capacitor 13 can be controlled adequately by controlling the current of the DC/DC converter according to the operation pattern information.

As explained above, in the first embodiment, the amount of energy E chargeable and dischargeable for the capacitor is calculated based on the operation pattern information of the swing motor in swinging and so on and the target voltage Vc* can be calculated.

In regeneration, the DC/DC converter 14 is controlled so as to increase the target voltage Vc* of the capacitor 13, for example, according to the operation pattern information based on the swing speed, thereby reducing the frequency of charging the battery 12 while avoiding a sudden change in the target voltage to prevent a decline in efficiency due to charging of the battery.

In addition, the size of the capacitor 13 can be decreased by broadening the charge and discharge voltage range of the capacitor 13.

Figure 4:
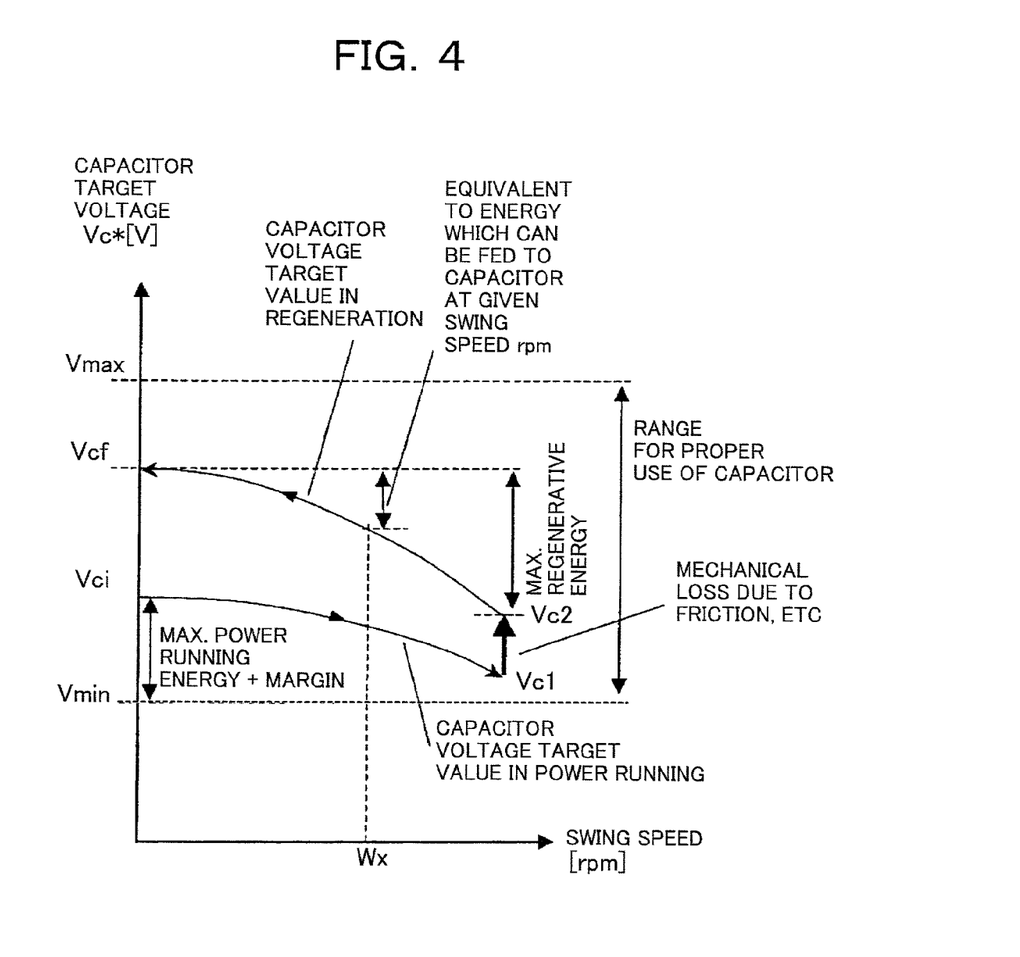
FIG. 4 shows an example of change in capacitor target voltage in the swing operation of the swing motor.

FIG. 4 shows an example of a pattern of change in the capacitor target voltage in the swing operation of the swing motor.

The capacitor target voltage gradually decreases from Vci at the start of swinging as the energy is consumed for power running during acceleration. At the time when it changes from Vci to Vc1, change from power running to regeneration occurs and due to energy regeneration during regeneration operation (deceleration), Vci gradually rises and finally stops rising when it becomes Vcf.

Here, the reason for the stepwise rise of the capacitor target voltage Vci from Vc1 to Vc2 during the period of change from power running operation to regeneration operation is that all the kinetic energy and potential energy obtained by power running cannot be recovered in the regeneration process due to mechanical loss caused by friction, etc. and electrical loss caused by inverter efficiency, etc. Similarly, the target voltage Vcf at the end of swing motion is set to a higher level than the target voltage Vci at the start.

The reason that the response of the controller is a problem here is that it is related to a sudden rise in the target voltage at the time of change from power running to regeneration and if this point of change is known in advance, control can be done in expectation of the response of the controller.

Figure 5:
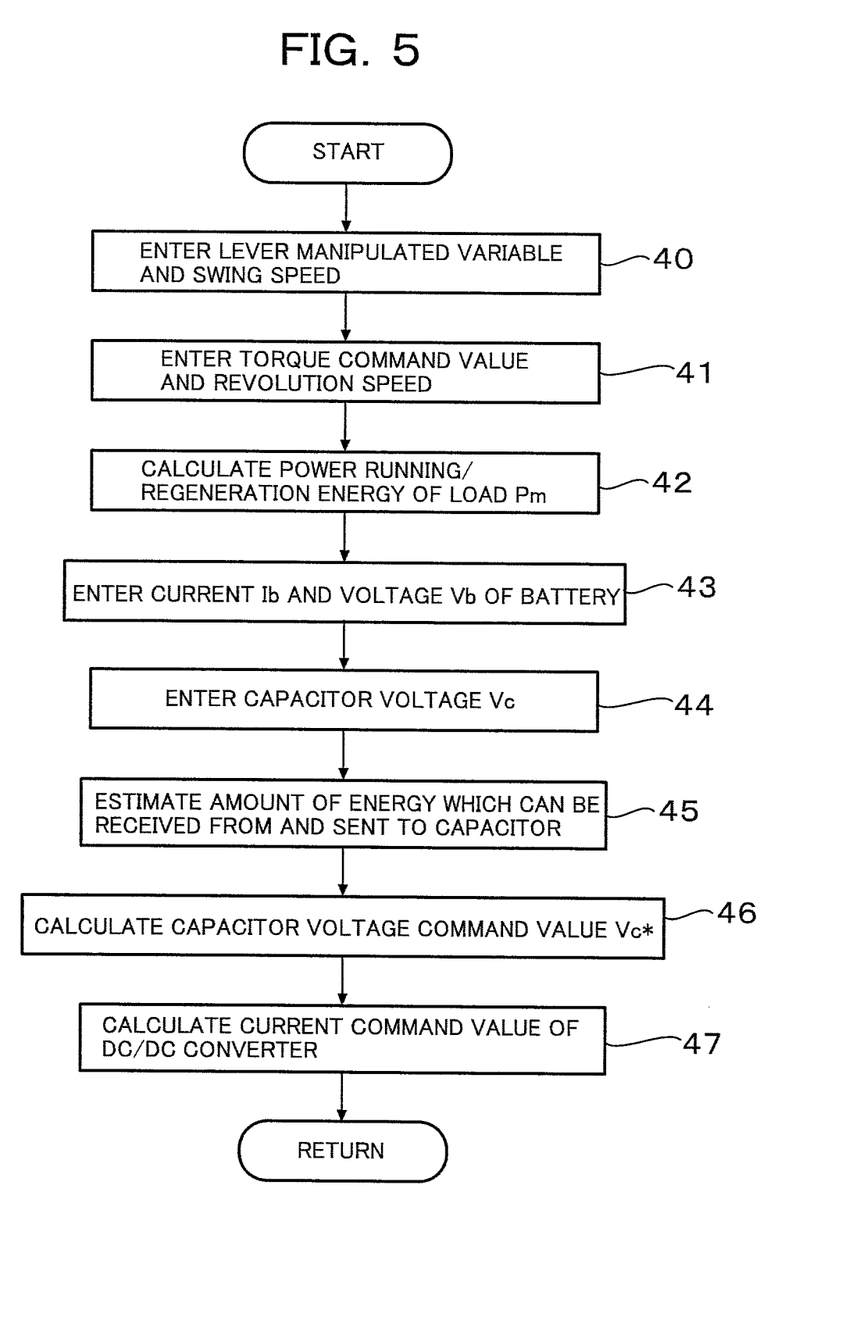
FIG. 5 explains the process performed by the controller (process of calculating a capacitor voltage command value).

FIG. 5 explains the process performed by the controller 11 (process of calculating a capacitor voltage command value).

At Step 40 in FIG. 5, the lever manipulated variable and the swing speed are entered.

At Step 41, torque command value Trq* and revolution speed ωm of the swing motor 36b are entered.

At Step 42, load power Pm is calculated using these data. For example, power Pm of the swing motor during a swing is calculated from Equation (1) by multiplying the motor torque command value Trq* by revolution speed ωm:

$$Pm = Trq^* \omega m \quad (1)$$

Here, depending on whether Pm>0 or not, a decision can be made as to whether the motor is outputting driving power (motor power running mode) or working for braking and regeneration (regeneration mode).

Although a decision is made using the torque command value and revolution speed of the motor in this case, it is also possible to make a decision as to whether electricity is being discharged to the power supply device or supplied from it depending on whether DC current Idc flowing to the inverter 4 is positive or negative. Also, the power Pm of the load can be calculated from the manipulated variable of the control lever entered at Step 40.

At Step 43, battery current Ib and battery voltage Vb are entered.

At Step 44, capacitor voltage Vc and capacitor current Ic are entered. Here, the target voltage Vc of the capacitor 13 is different between the power running mode and regeneration mode of the motor and determined depending on the battery voltage Vb and the voltage Vc of the capacitor 13. For example, in the power running mode of the motor, the energy stored in the capacitor 13 is consumed as far as possible to prevent discharge from the battery.

Specifically, when the capacitor voltage Vc is higher than the battery voltage Vb, the DC/DC converter 14 is controlled so that the target voltage Vc* of the capacitor 13 is decreased and power running energy is taken out from the capacitor 13. Also, in the regeneration mode of the motor, regenerative energy is recovered by the capacitor 13 as far as possible to prevent the battery from being charged.

When the capacitor voltage Vc is lower than a prescribed value, the DC/DC converter 14 is controlled so that the target voltage Vc* of the capacitor 13 is increased and regenerative energy is recovered by the capacitor 13.

At Step 45, the amount of energy which can be received from and sent to the capacitor is estimated according to the entered battery current Ib, battery voltage Vb, capacitor voltage Vc, capacitor current Ic, power running/regeneration energy Pm, and potential energy.

In this embodiment, the amount of energy which can be received from and sent to the capacitor can be realized by calculating the amount of chargeable and dischargeable energy for the present capacitor voltage Vc successively.

During power running, the higher the capacitor voltage Vc, the more the amount of dischargeable energy and the lower the capacitor voltage Vc, the less the amount of dischargeable energy. During regeneration, the lower the capacitor voltage Vc, the more the amount of chargeable energy and the higher the capacitor voltage Vc, the less the amount of chargeable energy.

In other words, the amounts of chargeable and dischargeable energy for the present capacitor voltage Vc are predetermined. Therefore, in order to calculate the amount of energy which can be received from and sent to the capacitor from the capacitor voltage, it is advisable to store, in a tabular form, the relation between the capacitor voltage and the amounts of chargeable and dischargeable energy according to previously obtained operation pattern information.

Next, the amount of regenerative energy in swing motion is calculated and at Step 46, the voltage command value Vc* of the capacitor 13 is calculated based on the calculated amount of energy.

In other words, the grace period until the point of change between power running and regeneration is known from the present swing acceleration or swing angle and by issuing a control command adequate for a delay in the response of the controller before the point of change between power running and regeneration, the response of the DC/DC converter is improved.

Here, let's assume a swing motion for loading an object into an empty bucket. The regenerative energy generated by the kinetic energy is expressed by the following equation, wherein I denotes inertia moment and ω denotes angular velocity:

$$Ev = KvI\omega^2 \quad (2)$$

Here, Kv represents a predetermined constant number.

In regenerating kinetic energy Ev, all energy cannot be regenerated due to mechanical loss caused by friction, etc., so it is estimated that for example, about 70% is regenerated. In this case, Kv=0.7. The operation pattern of a hydraulic shovel or forklift is fixed, so Kv can be considered to be almost constant. Therefore, the target voltage Vc* can be calculated from the equation given below.

Here, Emax denotes the maximum storable energy which depends on the rating of the capacitor and C denotes the capacity of the capacitor.

$$Vc^* = \sqrt{2(Emax-Ev)/C} \quad (3)$$

As indicated in Equation (3), as the present traveling speed is higher, or the lift height or the load is larger, namely the kinetic energy or potential energy is larger, the target voltage Vc* is controlled to be lower.

At Step 47, the current command value of the DC/DC converter is calculated according to the capacitor voltage command value Vc* thus calculated.

The battery charge/discharge current is determined as follows according to the relation between the target voltage Vc* and the amount of energy which can be received from and sent to the capacitor 13.

For example, when the motor 3a is in the power running mode during an accelerated travel (Pm>0), the energy which can be sent from the capacitor 13 is compared with the energy E required for the travel and if all the required energy can be sent from the capacitor 13, the energy requested by the load can be sent without discharge from the battery 12. Therefore, the target voltage Vc* should be calculated so that the relation "$C/2 \cdot (Vc^2 - Vc^{*2}) = E$" holds in which C[F] represents the capacity of the capacitor in discharge of electricity. Therefore, in discharge of electricity, by controlling the DC/DC converter 14 so as to attain the target voltage Vc*, all energy is supplied from the capacitor 13. At this time, control is made so that no energy is supplied from the battery 12, namely the battery current Ib=0. When the capacitor voltage Vc becomes the battery voltage Vb or less, control is made so that energy is supplied from the battery 12 to the load.

Also, when the motor 36a outputs regenerative energy during a swing (Pm≤0), comparison is made among the energy which can be recovered by the capacitor 13, the energy to be recovered during deceleration and the amount of energy which can be stored in the capacitor 13 and if all the energy can be recovered by the capacitor, all the regenerative energy is recovered without charging the battery 12.

Therefore, during regeneration (charging), the DC/DC converter controls the voltage rise so that the capacitor voltage becomes the target voltage Vc* and feeds electric energy to the capacitor. However, when the voltage Vc of the capacitor 13 is almost fully charged, control is made to feed regenerative energy to the battery 12.

If the energy consumption during power running is low and the voltage Vc of the capacitor 13 does not go down, it may be that the battery 12 is charged with a very small amount of electricity and the energy of the capacitor 13 is consumed.

As described above, according to this embodiment, most regenerative energy can be recovered by the capacitor 13 without charging the battery 12 at a large current during regeneration, so that the utilization efficiency of the capacitor is improved. If the battery 12 is charged at a very low current value Ib, the battery 12 can be charged efficiently. Also, if the energy fed to the capacitor 13 becomes low, namely the voltage Vc of the capacitor 13 is equal to or less than the battery voltage Vb, control is made so that the battery 12 feeds electricity to the capacitor 13.

As explained above, according to this embodiment, input and output of energy are carried out using the capacitor 13 as far as possible in a situation that the hydraulic shovel accelerates and stops repeatedly when it swings or the boom moves up and down repeatedly. Consequently, loss which occurs during regeneration in the conventional technique of charging or discharging a battery (lead battery) can be reduced. In addition, since the capacity of the battery may be decreased, compactness can be achieved and the utilization efficiency of the power supply system can be improved.

Second Embodiment

Next, the second embodiment will be described.

Figure 6:
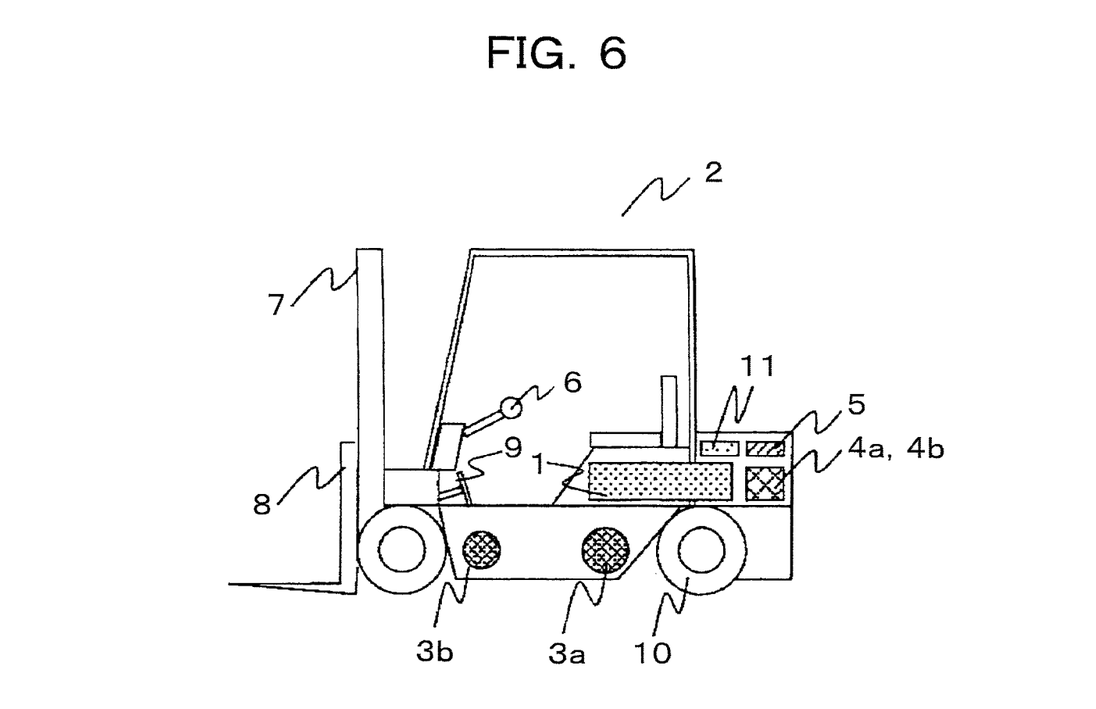
FIG. 6 illustrates a forklift provided with a power supply system according to a second embodiment.

FIG. 6 illustrates a forklift provided with a power supply system according to the second embodiment.

Figure 7:
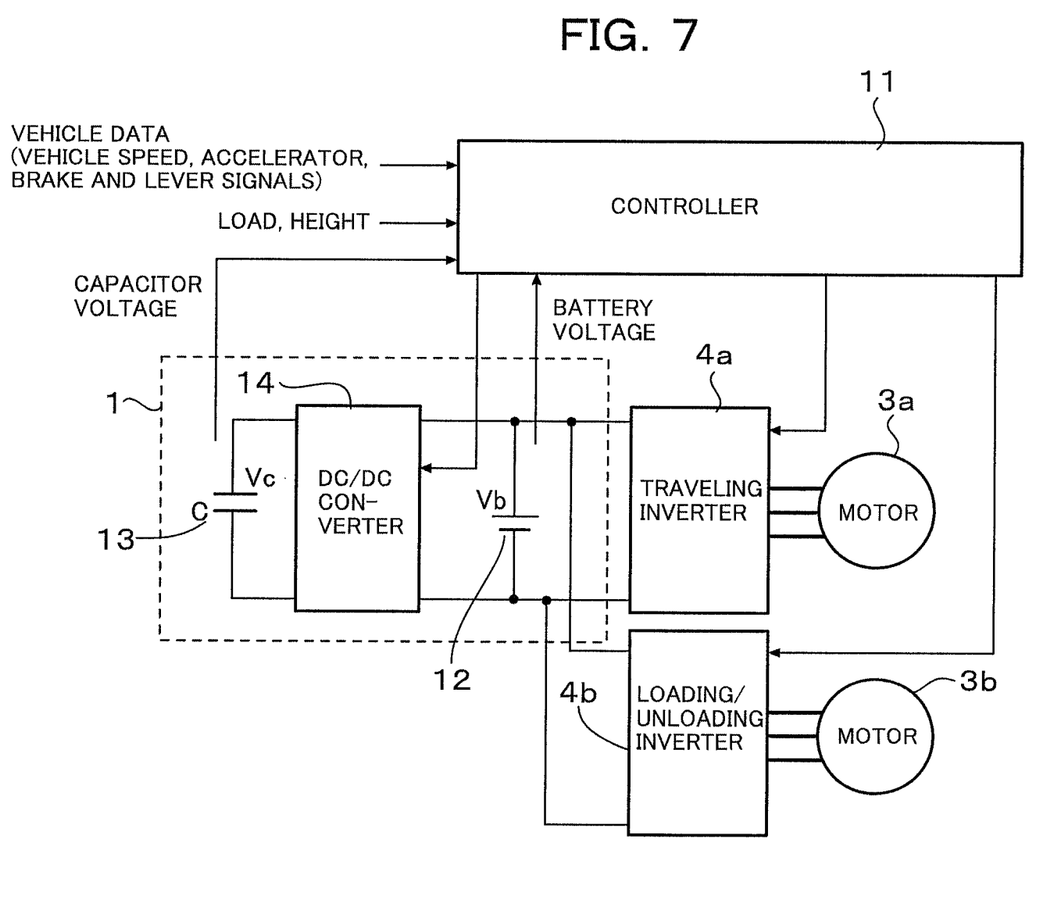
FIG. 7 illustrates the configuration of the forklift shown in FIG. 6 and details of the power supply system incorporated therein.

FIG. 7 is a view illustrating details of the power supply system 1 shown in FIG. 1 and the control system of the forklift. In FIG. 7, the power supply system 1 includes a battery 12 and a capacitor 13. The battery 12 is a lead battery or lithium-ion battery and in this case it is assumed to be a lead battery with a voltage of 48 V. The capacitor 13 may be an electric double layer capacitor having a capacity of several tens of farads.

Normally a current of approximately 150 A flows in an inverter 4 and if the load is large, a current of 300 A to 400 A may flow in it. If a lead battery is used as the battery 12, a capacity of 400 Ah or so is required depending on the forklift workload and the number of working hours per day.

The forklift 2 includes a mast 7, a fork 8, pedals 9 for an accelerator and a brake, an AC motor 3a for traveling. The driving power of the AC motor 3a is transmitted to driving wheels 10 to drive the driving wheels 10. The power of the AC motor 3a is controlled by the inverter 4 which is controlled according to a command from a controller 11. The AC motor 3a may be directly connected to the driving wheels or connected through gear to it.

The AC motor 3a is a motor generator and in the power running mode, it generates driving power as a motor and when it is driven by the driving wheels 10, it functions as a generator to regenerate energy.

The inverter 4a is provided in order to control the power generated by the AC motor 3a arbitrarily. Specifically, during power running, the inverter 4a converts the DC power stored in the power supply system 1 into AC power and supplies it to the AC motor 3a. During regeneration, the inverter 4a converts AC power from the AC motor 3a into DC power and supplies it to the power supply system 1.

The controller 11 calculates the manipulated variable of the accelerator 9 or brake by the driver or a torque command to the AC motor 3a according to the state of each component to control the vehicle.

With the forklift 2, the lifting motion or tilting motion of the fork 8 is controlled using a lever 6. It has an AC motor 3b for lifting. Furthermore, the forklift 2 has an actuator which converts the rotary motions of the motor into linear vertical motions to move up and down the fork 8. Since the fork 8 is comprised of a pair of claws, the power of the AC motor 3b is transmitted to the actuator and distributed through a coupler (not shown) to the two claws and controlled by an inverter 4b which receives a command from the controller 11.

To move up the fork, the AC motor 3b is activated by the inverter 4b and to move down the fork, the potential energy of the loaded goods is used to drive the AC motor 3b as a generator so that the regenerated energy is fed to the power supply system 1. Although an example of the configuration including one AC motor 3b for lifting is given here, instead the configuration may include an AC motor 3b and an AC motor 3c to drive the left and right claws of the lift respectively, namely the configuration may include independent linear actuators to move up and down the lift. In this case, the two AC motors are controlled by inverters provided for the motors respectively.

In this embodiment as well, the controller shown in FIG. 2 is used as the controller shown in FIG. 7.

In this example as well, the operation estimating means 19 estimates the next point of operation change according to the revolution speed or torque of the motor, the manipulated variable of the accelerator 9, brake or lever 6 and the information on the goods loaded on the fork 8: for example, if power running is currently underway, the point of change to the regeneration mode is estimated and if regeneration is currently underway, the point of change to the power running mode is estimated.

For example, while the accelerator is being pressed, it can be estimated that the vehicle is traveling and the next operation will be a regenerative operation to stop the vehicle. Also, while the fork 8 is moving up by operation of the lever 6, it can be estimated that the next operation will be a descending motion which is a regenerative operation. In this way, the point of operation change between power running and regeneration can be estimated by detecting acceleration or deceleration during a travel or detecting upward or downward motion of the lift during loading or unloading. Based on the (present) traveling or loading/unloading motor torque or inverter current value and the previously acquired and stored operation pattern information, it is also possible to estimate when change to regenerative braking operation should occur to stop (point of change).

In this embodiment, the current of the DC/DC converter 14 is controlled so that the voltage Vc of the capacitor 13 has a desired value depending on the operation of the forklift 2 and the state of each component.

Figure 8:
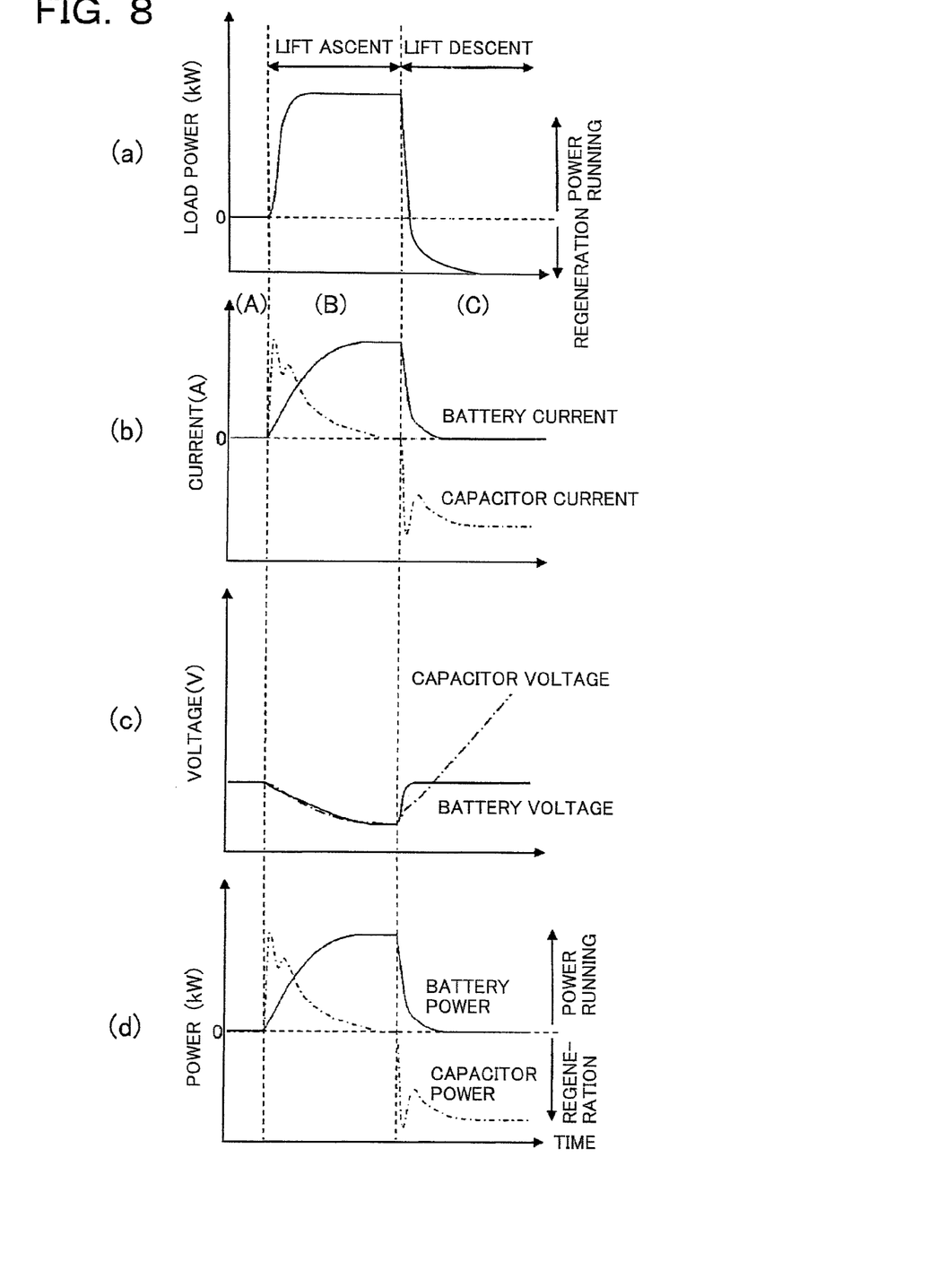
FIG. 8 shows changes in different types of output in the ascent and descent of the fork.

FIG. 8 shows changes in different, types of output in the ascent and descent of the fork, in which FIG. 8(a) shows load power, FIG. 8(b) shows battery current and capacitor current, FIG. 8(c) shows battery voltage and capacitor voltage, and FIG. 8(d) shows battery and capacitor power changes.

As shown in FIG. 8, in a zone (A) where the fork begins ascending, in order to enable the capacitor 13 to output energy, the target voltage Vc* is controlled so as to prevent current Ib from flowing to the battery 12 and decrease the capacitor voltage Vc. In a zone (B) after the capacitor voltage Vc goes down to the battery voltage Vb, energy is also fed from the battery 12.

Next, during descent of the fork, energy is regenerated and in this regeneration zone (C), the capacitor voltage Vc is controlled to rise so as to make the battery current Ib=0. This suggests that the voltage of the capacitor 13 rises and all regenerative energy is recovered by the capacitor.

As explained above, in an operation pattern in which the forklift travels and stops repeatedly, input and output of energy are carried out using the capacitor 13 as far as possible. Consequently, loss in regeneration which would occur with the conventional lead battery can be reduced and the utilization efficiency of the power supply system is improved.

Although an example of the traveling motor 3a for the battery fork to travel has been given in the above explanation, the same is true for the lifting motors 3b and 3c. In the case of the lifting motors 3b and 3c, there are a variety of situations: for example, they run to move up or down the fork with a load or to move up the fork with a load, unload the load and move down the fork.

In this case as well, whether or not there is a load (goods) can be presumed using control lever information obtained by the operation estimating means 19 shown in FIG. 3. For example, when a lifting motion is combined with a tilting motion, the forklift is presumed to be carrying goods and when a lifting motion occurs again, it suggests a situation that the goods are unloaded. Also, how much regenerative energy can be obtained during the descent of the lift can be estimated by providing a load sensor and using it to measure the weight of the goods. By estimating the regenerative energy in advance, it is possible to decide whether or not the capacitor 13 can recover all regenerative energy. As in the case of the traveling motor 3a, the utilization efficiency of the power supply system can also be improved in the case of the lifting motors by using the capacitor as far as possible to deal with input and output of the energy generated during the ascent and descent of the fork.

As explained above, according to the embodiment of the present invention, in a situation that the forklift travels and stops repeatedly or the lift moves up and down repeatedly, input and output of energy are carried out using the capacitor 13 as far as possible. Consequently, loss in regeneration which would occur with the conventional lead battery can be reduced and the utilization efficiency is improved.

Swinging and excavating motions of the hydraulic shovel and traveling and lifting motions of the forklift have been described so far; however, the invention can be applied to other types of construction machine in a similar way. For example, it can be applied to forward and backward movements and soil loading and unloading motions in a wheel loader. As mentioned above, in construction machines, operation patterns are almost fixed unlike automobiles, so energy balance can be controlled adequately.

REFERENCE SIGNS LIST

1 . . . Power supply system
2 . . . Forklift
3 . . . AC motor
4 . . . Inverter
5 . . . Plug
6 . . . Control lever
7 . . . Mast
8 . . . Fork
12 . . . Battery
13 . . . Capacitor
14 . . . DC/DC converter
16 . . . Power running/regeneration energy estimating means
17 . . . Capacitor input/output load energy estimating means
18 . . . Capacitor target voltage calculating means
19 . . . Operation estimating means
20 . . . Battery input/output energy calculating means

The invention claimed is:

1. A construction machine or industrial vehicle comprising:
   a power supply system which includes a chargeable and dischargeable capacitor and a feeder circuit connecting a chargeable and dischargeable battery and the capacitor to a load capable of power running and regeneration, feeds energy stored in the capacitor through an inverter to the load and feeds regenerative energy of the load through the inverter to the capacitor, wherein: the load is an electric motor;

the capacitor is connected through a DC/DC converter to the load;

the DC/DC converter includes control means that controls energy charged or discharged by the capacitor through the DC/DC converter; and the control means includes:

power running/regeneration operation estimating means which estimates an operation pattern including a point of change between power running and regeneration modes of the motor according to previously stored operation pattern information including a point of change between power running and regeneration in repetitive work and revolution speed and torque of the motor, or DC current supplied to the inverter, or control lever information; and capacitor target voltage calculating means which controls an output command value of the DC/DC converter according to the point of change and operation pattern estimated by the power running/regeneration operation estimating means so that a capacitor target voltage sequentially decreases in power running and sequentially increases in regeneration.

2. A construction machine or industrial vehicle comprising:

a power supply system which includes a chargeable and dischargeable capacitor and a feeder circuit connecting a chargeable and dischargeable battery and the capacitor to a load capable of power running and regeneration, feeds energy stored in the capacitor through an inverter to the load and feeds generative energy of the load through the inverter to the capacitor, wherein: the load is an electric motor;

the capacitor is connected through a DC/DC converter to the load;

the DC/DC converter includes control means that controls energy charged or discharged by the capacitor through the DC/DC converter; and the control means includes:

power running/regeneration operation estimating means which estimates an operation pattern including a point of change between power running and regeneration modes of the motor according to previously stored operation pattern information including a point of change between power running and regeneration in repetitive work and revolution speed and torque of the motor, or DC current supplied to the inverter, or control lever information;

power running/regeneration energy estimating means that calculates power running/regeneration energy according to the operation pattern estimated by the power running/regeneration operation estimating means;

capacitor input/output energy calculating means that calculates energy to be received from and sent to the capacitor according to the energy estimated by the power running/regeneration energy estimating means and capacitor voltage; and capacitor target voltage calculating means which controls a capacitor target voltage according to the input/output energy calculated by the capacitor input/output energy calculating means so that the capacitor target voltage sequentially decreases in power running and sequentially increases in regeneration, and controls an output command value of the DC/DC converter according to the target voltage.

3. The construction machine or industrial vehicle provided with a power supply system according to claim 1 or 2, wherein according to the operation pattern estimated by the power running/regeneration means, the control means issues a command to vary the capacitor target voltage by a voltage amount equivalent to energy loss between power running and regeneration in a stepwise pattern prior to the point of change between power running and regeneration by time equivalent to a response delay of the control means.

4. The construction machine or industrial vehicle provided with a power supply system according to claim 1 or 2, wherein the control means includes battery input/output energy estimating means that estimates energy which can be received from and sent to the battery, and compares the regenerative energy estimated by the power running/regeneration energy estimating means with the energy recoverable by the capacitor as estimated by the capacitor input/output estimating means, and calculates a target voltage of the capacitor so as to feed regenerative energy to the battery when the capacitor estimated by the capacitor input/output estimating means is almost fully charged, and controls an output command value of the DC/DC converter according to the target voltage.

5. The construction machine or industrial vehicle provided with a power supply system according to claim 1 or 2, wherein: the construction machine or industrial vehicle includes the chargeable and dischargeable battery connected to the load; and the control means includes battery input/output energy calculating means that calculates energy to be received from and sent to the battery according to energy estimated by power running/regeneration energy estimating means and battery voltage, and calculates a capacitor target voltage according to the energy estimated by the power running/regeneration energy estimating means and the input/output energy calculated by the battery input/output energy calculating means, and controls an output command value of the DC/DC converter according to the target voltage.

6. The construction machine or industrial vehicle provided with a power supply system according to claim 1 or 2, wherein: the construction machine or industrial vehicle includes the battery connected to the load; and the control means controls power of the DC/DC converter so as to increase the capacitor voltage when regeneration operation is underway.

* * * * *